UNITED STATES PATENT OFFICE.

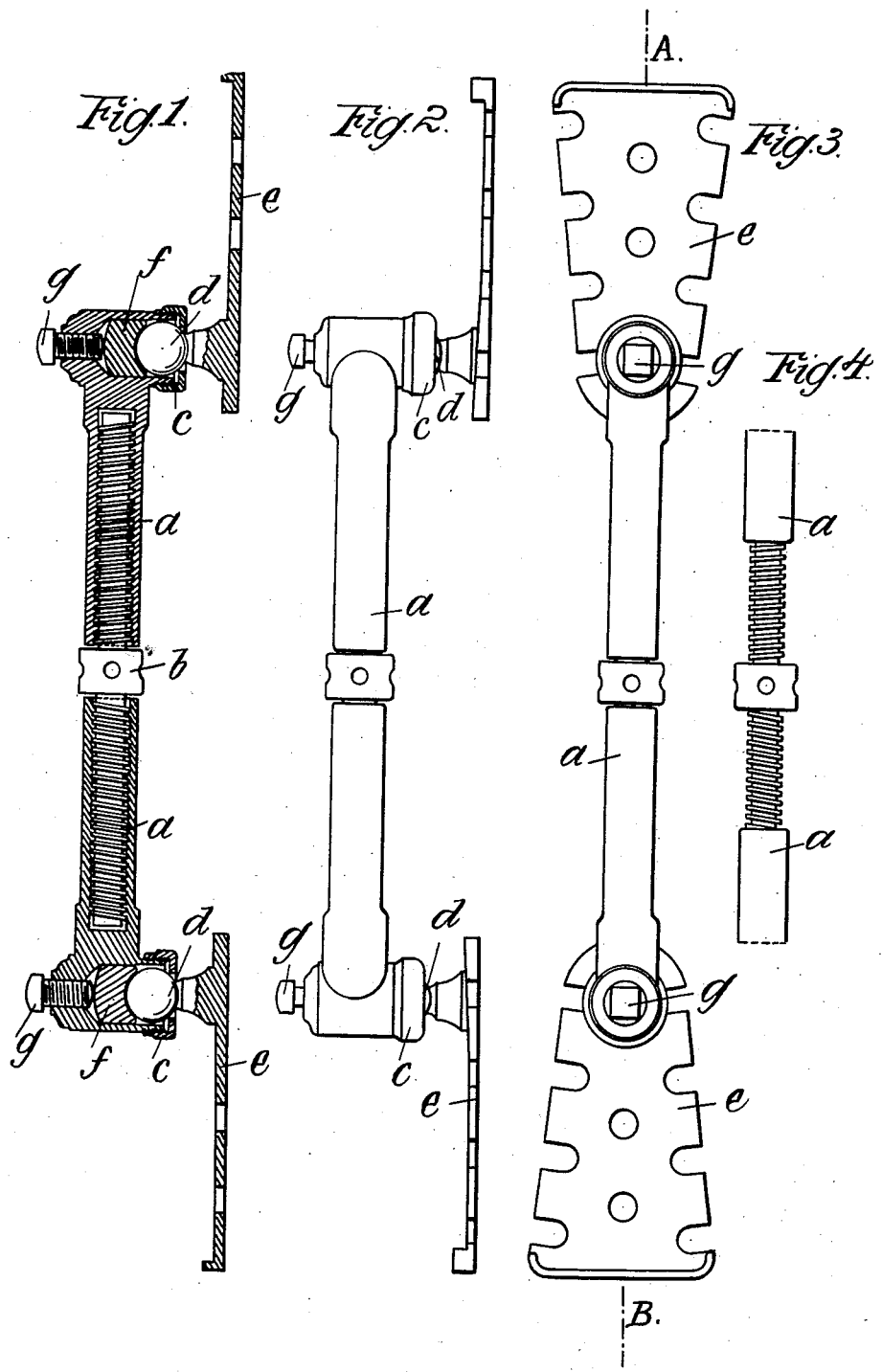

GUSTAV PETRY, OF WIESBADEN, GERMANY.

STRETCHING DEVICE FOR THE TREATMENT OF FRACTURED BONES.

1,101,954.   Specification of Letters Patent.   Patented June 30, 1914.

Application filed December 27, 1912.   Serial No. 738,909.

*To all whom it may concern:*

Be it known that I, GUSTAV PETRY, merchant, a citizen of the German Empire, and resident of Wiesbaden, Germany, with the post-office address Mauritiustrasse 9, have invented new and useful Improvements in Stretching Devices for the Treatment of Fractured Bones, of which the following is a specification.

The present invention relates to a distraction clamp with ball joints for the treatment of fractured bones.

The invention consists in the provision, at the outer ends of each of the sleeves of the locking attachment which surround and engage with the right-and-left handed screw spindle, of a ball-bearing cup which is provided with a set screw and adjustment ring, each of said cups being adapted to engage and fix the ball head of a splint bar.

The invention is shown in the accompanying drawing wherein—

Figure 1 is a longitudinal section on A—B of Fig. 3; Fig. 2 an elevation and Fig. 3 a plan of the stretching device. Fig. 4 shows the screw spindle or pressure screw alone, with the ends of the corresponding sleeves.

The apparatus mainly consists of two tension sleeves $a$ connected together by a tension screw, and each provided at its outer end with an enlarged bore for the reception of a ball joint consisting of a ball head $d$, pressure cup $f$, and set screw $g$. By turning the tension screw, which extends in opposite directions and is provided on the one side with a right-hand thread and on the other with a left-hand thread, the tension sleeves are forced apart.

Elongated metal plates $e$ are riveted on the ball head, and these are embedded in the plaster of Paris splints when the apparatus is used. The whole apparatus may be made of steel or brass, and tinned. The ball head of the ball joint is securely held in the widened bore of the pressure sleeve by a threaded metal ring $c$ screwing on the pressure sleeve. The ball joint is made fast by means of a screw $g$ which presses the pressure cup against the ball head. When all four of the ball joints have been loosened on the plastered splints on the two longitudinal sides of the fractured limb and the plaster splint cut through in a circle, the lower portion of the fracture can be moved inwardly or outwardly, and up or down, and also turned inwardly or outwardly, that is to say, its position can be changed in all directions so that it becomes possible to counteract any shifting of the ends of the fracture.

Now what I claim and desire to secure by Letters Patent is the following:

A surgical appliance for treating bone fractures comprising a pair of sleeves provided with right and left hand screw-threads, each sleeve having at one end a ball receiving socket, splint bars each having a ball connected with its face by a shank extending laterally to the bar, means for retaining the balls in the said sockets while permitting the splint bars to tilt in any direction, means for locking the balls and hence the splint bars in their adjusted positions and a right and left hand screw spindle engaging the threads in the sleeves to move the sleeves and hence the splint bars toward and away from each other.

In testimony, that I claim the foregoing as my invention, I have signed my name in presence of two witnesses, this twelfth day of December 1912.

GUSTAV PETRY.

Witnesses:
HERMAN PEISCHER,
MINNA RITZL.